G. MITCHELL.
Dredging Machine.
No. 104,980. Patented July 5, 1870.
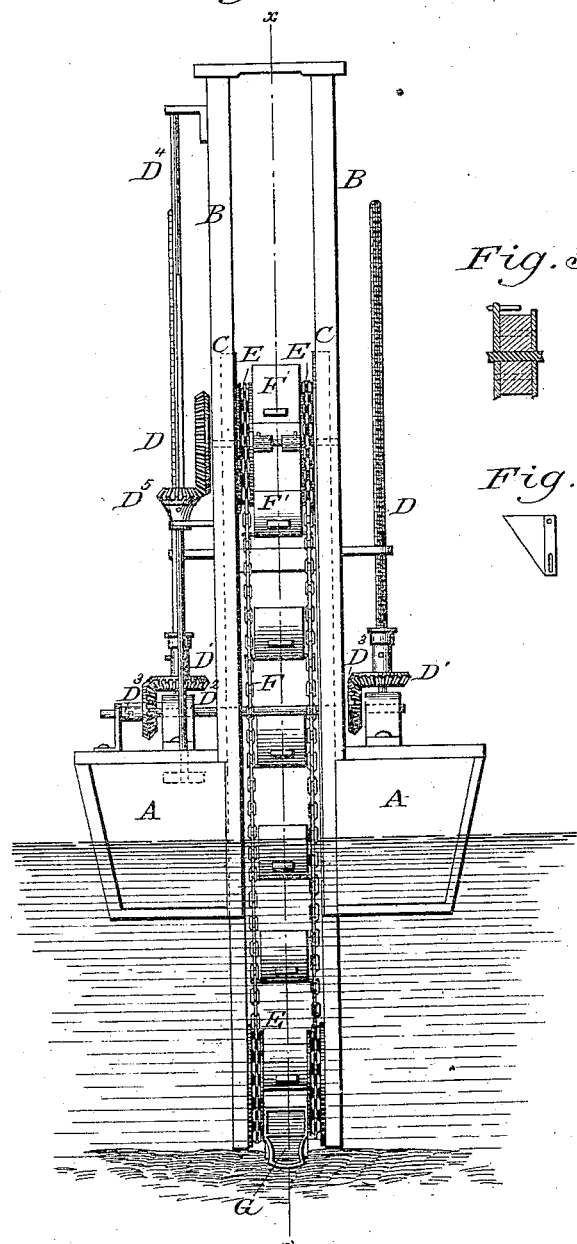
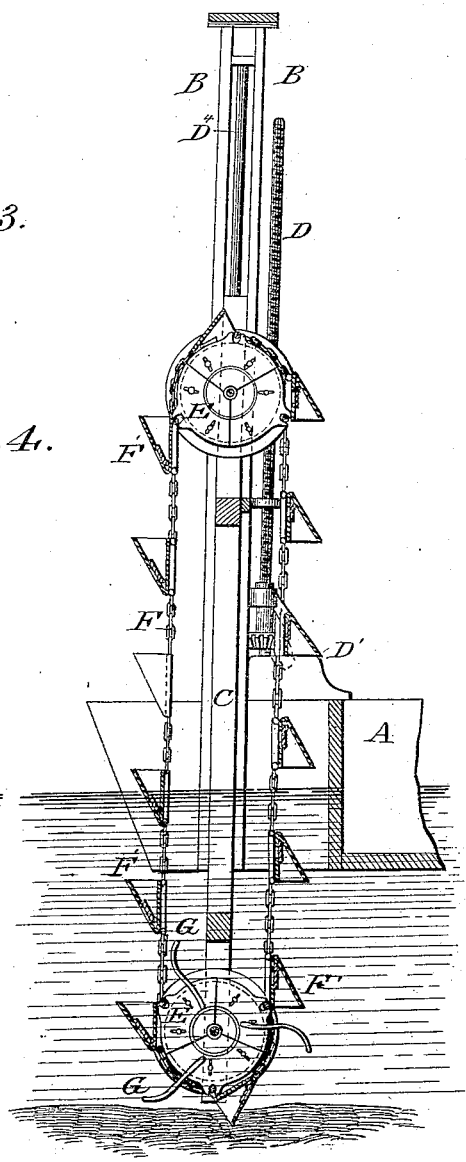

United States Patent Office.

GOVE MITCHELL, OF PHILADELPHIA, PENNSYLVANIA.

Letters Patent No. 104,980, dated July 5, 1870.

IMPROVEMENT IN DREDGING-MACHINES.

The Schedule referred to in these Letters Patent and making part of the same.

*To all whom it may concern:*

Be it known that I, GOVE MITCHELL, of the city and county of Philadelphia and State of Pennsylvania, have invented a new and useful Improvement in Dredging-Machines; and I do hereby declare that the following is a full, clear, and exact description thereof, reference being had to the annexed drawing making part of this specification, in which—

Figure 1 is a front elevation of my improved machine, showing the boat upon which it is placed, the frame-work which supports the chain of buckets, and the gearing for driving them, the screws for elevating the same, and the gearing for turning them.

Figure 2 is a sectional elevation on line $x\,x$ of fig. 1, showing the construction of the sprocket-wheels around which the chain and buckets pass, the valves or doors in said buckets, and the knives or cutters which precede the buckets.

Figure 3 is a transverse section of one of the sprocket-wheels.

Figure 4 is a side view of one of the buckets, to show the elongated slot in its flange.

Corresponding letters refer to corresponding parts in the several figures.

In operating dredging-machines as heretofore constructed, great difficulty has been experienced in keeping the chain to which the buckets or shovels are attached sufficiently tight to prevent them slipping upon the wheels around which they pass, and, further, from the fact that no adequate provision has been made to enable the buckets to readily accommodate themselves to the chord of the arc while the chain traverses the arc itself; and, further, from the fact that no adequate provision has heretofore been made for cutting or loosening the earth just in advance of the buckets while they are being filled; and still further from the fact that the arrangements for raising and lowering the chain-buckets and the cutters have heretofore been inadequate.

My object in producing the within-described improvements is to provide a remedy for the above-enumerated difficulties; and, to this end, The invention consists in the construction of the sprocket-wheels over which the chain which carries the buckets passes; and, further, in the means described for allowing the buckets to pass around or over said sprocket-wheels; and, further, in providing knives or cutters for operation directly in advance of the buckets while they are being filled; and, further, in an improved method of raising and lowering the buckets and the parts connected therewith; and, still further, in the combination and arrangement of the parts necessary to effect the above-named improvements.

To enable others skilled in the art to construct the same,

The letter A in the drawing refers to a boat upon which the elevator may be placed, and onto or into which the contents of the buckets may be discharged as they pass over the upper sprocket-wheel and assume the proper position for discharging their contents, or such contents may be discharged upon an apron placed at a right angle, or at any other angle, to the boat, so that, by revolving such apron or the rollers around which it passes, said contents may be carried to any other boat for removal to any desired locality.

B B refer to posts, which are firmly attached to the end of the boat A or to the sides of a recess formed in the end thereof, they being placed at a slight angle to the upper surface of such boat, and extending from the lower surface thereof to any required distance above it, to enable them to serve as guides for the sliding frame which carries the chain and buckets of the elevator.

C C refer to the side-bars of a sliding frame, which moves in grooves formed in the posts B B or upon ways attached thereto. This frame has a cross-bar extending from one of its sides to the other, for the purpose of keeping said bars at the proper distance from each other. This frame is to be of such a length as to admit of its lower end being passed for any required distance below the lower surface of the boat, and still extend up into the groove in the posts for a distance sufficient to give it the required support therein.

D D refer to screws which are placed in a vertical position just outside and in rear of the posts B B, so that the nut or nuts through which they work may be attached to the sliding frame C C, in order that, as said screws are rotated, said frame and the parts attached thereto may be raised or lowered according as said screws are turned in either direction.

Upon the lower ends of these screws, which rest in pillow-blocks which are firmly secured to the deck of the boat, and which have a curved arm projecting therefrom to support the screw and keep it in position, there are secured beveled pinions or wheels, $D^1$, which mesh into and are driven by corresponding wheels, $D^3$, arranged upon a horizontal shaft, $D^2$, to the end of which a crank may be attached for the purpose of turning the same; or it may be driven by a pulley or gear-wheel upon its end, which shall receive its motion from any prime mover.

$D^4$ refers to a vertical shaft which is stepped in the deck of the boat or in a pillow-block secured thereto, from which point it extends upward in a line with the center of the frame C C, to or nearly to the top of posts B, its upper end having a bearing in a bracket attached thereto.

Upon this shaft the wheel $D^5$ is placed, it being supplied with a set-screw or feather to move in a spline formed in the shaft, so that it shall be compelled to rotate with said shaft, but so that it may move freely longitudinally thereon.

The hub of this wheel is provided with an annular groove into which the bifurcated end of an arm passes, said arm being bolted to the frame C in such a position as to keep the wheel $D^5$ always in gear with the wheel $D^6$, soon to be described.

A pulley is to be placed upon this shaft $D^4$, or it may be a gear-wheel which will communicate to it motion which it may receive from any source.

$D^6$ refers to a beveled wheel which is attached to the outer end of a horizontal shaft, which has its bearings in boxes attached to the sides C C of the sliding frame, its arrangement being such that it meshes with and is driven by the pinion $D^5$.

E E refers to sprocket-wheels which are secured upon the shaft which carries the wheel $D^6$ near the top of the frame C C, and also upon another similar shaft near the lower end of such frame. Around these wheels the chains which carry the buckets pass, and in order that ample provision may be made for keeping these chains properly tightened, these wheels are constructed in the manner shown in figs. 2 and 3 of the drawing, it being as follows:

A flange or disk of the proper size is provided with a hub for securing it upon the shaft. To this disk the sheave over which the chains pass are secured by bolts, they being constructed in three or more sections and provided with elongated slots through which the bolts pass, so that, as the chain wears or becomes otherwise elongated, these sections can be set out, thus enlarging the diameter of the sheaves, and, as a consequence, tightening the chain. These sheaves may be made of wood or of metal, but, when made of wood, they are to have upon their surfaces which are opposite the disk, a plate of metal, such plate being in sections, as above described, in order that they may be set out with the sheaves, each of such sections to be provided with projections, in the outer ends or portions of which are formed semicircular recesses, so arranged as to embrace the lower rod upon each bucket as it passes over such wheel, and thus prevent the possibility of the slipping of the chains upon the sheaves.

F F refer to chains, of which there are two, one upon each end of the buckets. These chains may be of the ordinary flat-link kind, or of any other which will permit the buckets to be properly attached thereto. They are to be joined together in such a manner as to make them endless.

F' F' refer to a series of buckets or elevators, which are to be of substantially the form shown in the drawing, they being made of sheet or other metal, and provided with flanges upon their inner surfaces through which bolts or pins pass for the purpose of securing them to the chain, as shown in fig. 2, at the points where the lower pins, or those which are nearest to the smallest part of the bucket, pass through the flange thereof, an elongated aperture is formed, as clearly shown in fig. 4, in order that, as the buckets pass over the wheels, they may adapt themselves to the chord of the arc while the chain traverses the arc itself. These buckets may be provided with a valve, as shown in fig. 2, it being hinged in such a manner as to cover an aperture formed in the outer plate of the bucket, and so as to fall, by its own gravity, before the empty bucket enters the water, thus leaving an open space for the escape of any air which may be carried down into the water by such bucket, the effect being to prevent concussion caused by the buckets entering the water.

G G refer to a series of knives or cutters which are to be attached to the lower sprocket-wheel or to the shaft to which it is secured, they being of such form and arrangement as to pass between the chains F F just in advance of each bucket, and thus cut or loosen the amount of earth which each bucket takes up as it passes the point where they are filled.

The operation of this machine will be apparent from the foregoing description of its construction.

Having thus described my invention,

What I claim, and desire to secure by Letters Patent, is—

1. The sprocket-wheel E, with its disk fixed to the shaft, and interior adjustable sections, constructed substantially as and for the purpose set forth.

2. The construction and arrangement of the knives or cutters G G, upon the lower sprocket-wheel or its shaft, substantially as and for the purpose set forth.

3. The combination of the buckets F', provided with elongated apertures in their flanges, and the rods or bolts which confine them to the chains, or equivalent driving mechanism, substantially as and for the purpose set forth.

4. The combination and arrangement of the shaft $D^2$, wheels $D^3$ $D^1$, screws D, the nut or nuts through which such screws pass, and the sliding frame C C, for raising and lowering the elevators, substantially as set forth.

In testimony whereof I have signed my name to this specification in the presence of two subscribing witnesses.

GOVE MITCHELL.

Witnesses:
A. RUPPERT,
B. EDW. J. EILS.